(12) United States Patent
Shi et al.

(10) Patent No.: US 12,521,872 B2
(45) Date of Patent: Jan. 13, 2026

(54) ROBOT

(71) Applicant: QKM TECHNOLOGY (DONG GUAN) CO., LTD, Songshan Lake Dongguan (CN)

(72) Inventors: Jinbo Shi, Songshan Lake Dongguan (CN); Hongmiao Yu, Songshan Lake Dongguan (CN); Hong Liu, Songshan Lake Dongguan (CN); Qi Sha, Songshan Lake Dongguan (CN); Chunhua Yu, Songshan Lake Dongguan (CN); Lihui Chen, Songshan Lake Dongguan (CN); Hong Wang, Songshan Lake Dongguan (CN)

(73) Assignee: QKM TECHNOLOGY (DONG GUAN) CO., LTD, Songshan Lake Dongguan (CN)

( * ) Notice: Subject to any disclaimer, the term of this patent is extended or adjusted under 35 U.S.C. 154(b) by 232 days.

(21) Appl. No.: 18/269,588

(22) PCT Filed: May 27, 2021

(86) PCT No.: PCT/CN2021/096333
§ 371 (c)(1),
(2) Date: Jun. 26, 2023

(87) PCT Pub. No.: WO2022/134463
PCT Pub. Date: Jun. 30, 2022

(65) Prior Publication Data
US 2024/0326241 A1    Oct. 3, 2024

(30) Foreign Application Priority Data
Dec. 25, 2020  (CN) .......................... 202011563379.9

(51) Int. Cl.
B25J 9/00    (2006.01)
B25J 9/16    (2006.01)
(Continued)

(52) U.S. Cl.
CPC ............... B25J 9/161 (2013.01); B25J 18/00 (2013.01); B25J 19/0054 (2013.01)

(58) Field of Classification Search
CPC ........ B25J 9/043; B25J 19/0054; B25J 18/00; B25J 9/161
See application file for complete search history.

(56) References Cited

U.S. PATENT DOCUMENTS

| 10,953,537 B2* | 3/2021 | Niu .......................... B25J 9/104 |
| 2007/0119049 A1 | 5/2007 | Teranaka |
| 2015/0343636 A1* | 12/2015 | Toda .................... G05B 19/414 318/568.11 |

FOREIGN PATENT DOCUMENTS

| CN | 208323375 U | 1/2019 |
| CN | 210589287 U | 5/2020 |

(Continued)

OTHER PUBLICATIONS

International Search Report for corresponding application PCT/CN2021/096333 filed May 27, 2021; Mail date Sep. 26, 2021.

(Continued)

*Primary Examiner* — Gregory Robert Weber
(74) *Attorney, Agent, or Firm* — CANTOR COLBURN LLP

(57) ABSTRACT

Provided is a robot. The robot includes a base (1), a mechanical arm (2), and a driver controller integrated board (3). The mechanical arm (2) is movably mounted on the base (1). The driver controller integrated board (3) is disposed on the base (1), is configured to control the mechanical arm (2) to move, and includes a control module (31), a drive module (Continued)

(32), and a substrate (33). The control module (31) and the drive module (32) are disposed on the substrate (33), and the control module (31) is electrically connected to the drive module (32).

24 Claims, 7 Drawing Sheets

(51) Int. Cl.
    *B25J 18/00*    (2006.01)
    *B25J 19/00*    (2006.01)

(56) References Cited

FOREIGN PATENT DOCUMENTS

| | | |
|---|---|---|
| CN | 210630162 U | 5/2020 |
| CN | 112621725 A | 4/2021 |
| CN | 214446375 U | 10/2021 |
| DE | 19912496 A1 | 9/1999 |
| EP | 1525957 A1 | 4/2005 |
| EP | 3461599 A1 | 4/2019 |
| JP | H06301412 A | 10/1994 |
| JP | 2006000955 A | 1/2006 |
| JP | 2007175857 A | 7/2007 |
| JP | 2013197872 A | 9/2013 |
| JP | 2015223678 A | 12/2015 |
| JP | 2017135979 A | 8/2017 |
| JP | 2017216863 A | 12/2017 |
| JP | 2019063935 A | 4/2019 |
| WO | 2018021171 A1 | 2/2018 |

OTHER PUBLICATIONS

Chinese Office Action for corresponding application 202011563379.9 dated Jan. 11, 2025.
Chinese Office Action for corresponding application 202011563379.9 dated Jul. 13, 2024.
European Search Report for corresponding application EP21908474.6; Dated Jan. 3, 2025.
Japanese Office Action for corresponding application 2023-539188 dated Jul. 12, 2024.

* cited by examiner

ROBOT

CROSS-REFERENCE TO RELATED APPLICATIONS

This is a national stage application filed under 37 U.S.C. 371 based on International Patent Application No. PCT/CN2021/096333, filed May 27, 2021, which claims priority to Chinese Patent Application No. 202011563379.9 filed with the China National Intellectual Property Administration (CNIPA) on Dec. 25, 2020, the disclosures of which are incorporated herein by reference in their entireties.

TECHNICAL FIELD

The present application relates to the technical field of robots, for example, a robot.

BACKGROUND

Robots are a kind of cross-cutting technology product that integrates mechanical, electrical, and electronic information fields. The robots can replace humans to perform handling, assembly, loading and unloading, palletizing, welding, painting, and other work. The main components of these robots include at least a mechanical body, a deceleration assembly, an electric motor, a driver, and a controller. The controller and driver of a common robot on the market are discrete from each other, need to be mounted separately, and take up a lot of space, a lot of installation accessories are consumed, and the signal transmission connection is complicated. In addition, this split design is difficult to satisfy a usage requirement in a narrow space.

Based on the preceding status, it is necessary to design a new robot.

SUMMARY

The present application provides a robot, making the overall structure of the robot more compact.

A robot is provided and includes a base, a mechanical arm, and a driver controller integrated board.

The mechanical arm is movably mounted on the base.

The driver controller integrated board is disposed on the base, is configured to control the mechanical arm to move, and includes a control module, a drive module, and a substrate, where the control module and the drive module are disposed on the substrate, and the control module is electrically connected to the drive module.

As an optional solution, more than two driver controller integrated boards are provided, all the more than two driver controller integrated boards are spaced apart, stacked, and connected in cascade in sequence, the mechanical arm includes multiple arm bodies, and each of the more than two driver controller integrated boards controls at least one of the multiple arm bodies of the mechanical arm.

As an optional solution, one of the more than two driver controller integrated boards controls one of the multiple arm bodies of the mechanical arm.

Optionally, the number of the driver controller integrated boards is equal to the number of the arm bodies of the mechanical arm.

Optionally, any of the at least two driver controller integrated boards is capable of acting as a master control board, and any of the at least two driver controller integrated boards is configured to control signals from all the at least two driver controller integrated boards and is connected to an external device signal.

Alternatively, all the at least two driver controller integrated boards are connected to a cloud controller, where the cloud controller is configured to control signals from all the at least two driver controller integrated boards and is connected to an external device signal.

As an optional solution, the robot further includes a connecting seat, where the connecting seat includes more than two first cascade sockets for more than two driver controller integrated boards to be plugged in, and all the more than two first cascade sockets are spaced apart and connected in cascade in sequence.

As an optional solution, the robot further includes a drive mechanism, where the drive mechanism is mounted on the base or the mechanical arm, the drive mechanism is electrically connected to the driver controller integrated board, and the drive mechanism is configured to drive the mechanical arm to move.

As an optional solution, the base is provided with an accommodation cavity, and the drive mechanism is mounted in the accommodation cavity.

As an optional solution, the drive mechanism includes a drive motor and a deceleration assembly, where the drive motor is mounted on the base or the mechanical arm, the deceleration assembly is mounted on the drive motor, and an output end of the drive motor is transmissively connected to the deceleration assembly.

As an optional solution, the drive mechanism further includes a flange, where the flange is mounted on the base or the mechanical arm, and the drive motor and the deceleration assembly are mounted on the flange.

As an optional solution, the drive mechanism is a drive device made of piezoelectric ceramic.

As an optional solution, the robot further includes a heat dissipation structure, where the heat dissipation structure is disposed on the base.

As an optional solution, the heat dissipation structure uses air cooling heat dissipation.

As another optional solution, the heat dissipation structure uses liquid cooling heat dissipation.

As an optional solution, the heat dissipation structure includes a first cooling fan, where the first cooling fan is opposite to the driver controller integrated plate, and the first cooling fan is configured to accelerate diffusion of heat from the driver controller integrated plate to all regions within the base and dissipate the heat to an outer side through a wall body of the base.

As an optional solution, the heat dissipation structure includes a second cooling fan, the base is provided with a heat dissipation hole, the second cooling fan is opposite to the heat dissipation hole, and the second cooling fan is configured to discharge heat from an inner side of the base to an outer side of the base.

As an optional solution, the heat dissipation structure includes a heat sink, where the heat sink is disposed on a wall body of the base.

Optionally, the heat sink is disposed on the outer side and/or inner side of the wall body of the base.

As an optional solution, the driver controller integrated board is disposed near the wall body on which the heat sink is disposed.

As an optional solution, the driver controller integrated board further includes a first communication module disposed on the substrate, where the first communication module is electrically connected to the control module and/or the drive module.

As an optional solution, the first communication module is configured to be connected to a network.

As an optional solution, the first communication module is connected to the network in a wired or wireless manner.

As an optional solution, the control module includes a first control part and a second control part, where the first control part and the first communication module are disposed on a first side of the substrate, and the second control part and the drive module are disposed on a second side of the substrate.

As an optional solution, each of the at least two driver controller integrated boards further includes a first communication module disposed on the substrate, where the first communication module is electrically connected to the control module, and different ones of the at least two driver controller integrated boards are connected to each other by signals from first communication modules of the different ones of the at least two driver controller integrated boards.

As an optional solution, the robot further includes a connecting plate, where the connecting plate and the at least two driver control integrated boards are spaced apart and cascaded, the connecting plate is configured to control signals from all the at least two driver controller integrated boards and is connected to an external device signal, the connecting plate includes a third control part and a mounting plate, the third control part is disposed on the mounting plate, the more than two driver controller integrated boards are connected in cascade in sequence, and the third control part is electrically connected to at least one of the at least two driver controller integrated boards.

As an optional solution, the connecting plate further includes a second communication module, where the second communication module is disposed on the mounting plate, and the third control part is electrically connected to the second communication module and at least one of the at least two driver controller integrated boards.

As an optional solution, the second communication module is configured to be connected to a network.

As an optional solution, the second communication module is connected to a network in a wired or wireless manner.

As an optional solution, the robot further includes a connecting seat, where the connecting seat includes more than two first cascade sockets for the more than two driver controller integrated boards to be plugged in and one second cascade socket for the connecting plate to be plugged in, all the more than two first cascade sockets are spaced apart along a column and connected in cascade in sequence, and the second cascade socket is electrically connected to at least one of the more than two first cascade sockets.

As an optional solution, the base is provided with an accommodation cavity, and the driver controller integrated board is disposed in the accommodation cavity; or a control box is mounted on an outer side of a wall body of the base, and the driver controller integrated board is disposed in the control box.

As an optional solution, the robot further includes a control function board or a drive function board, where the control function board or the drive function board is disposed on the mechanical arm.

A robot is provided and includes a base, a mechanical arm, a control box, and a driver controller integrated board.

The mechanical arm is movably mounted on the base.

The control box is spaced apart from the base.

The driver controller integrated board is disposed in the control box, is configured to control the mechanical arm to move, and includes a control module, a drive module, and a substrate, where the control module and the drive module are disposed on the substrate, and the control module is electrically connected to the drive module.

As an optional solution, more than two driver controller integrated boards are provided, the mechanical arm includes multiple arm bodies, all the more than two driver controller integrated boards are spaced apart, stacked, and connected in cascade in sequence, and each of the more than two driver controller integrated boards controls at least one of the multiple arm bodies of the mechanical arm.

Optionally, one of the more than two driver controller integrated boards controls one of the multiple arm bodies of the mechanical arm. Optionally, the number of the driver controller integrated boards is equal to the number of the arm bodies of the mechanical arm.

As an optional solution, any of the at least two driver controller integrated boards is capable of acting as a master control board, and any of the at least two driver controller integrated boards is configured to control signals from all the at least two driver controller integrated boards and is connected to an external device signal; or all the at least two driver controller integrated boards are connected to a cloud controller, where the cloud controller is configured to control signals from all the at least two driver controller integrated boards and is connected to an external device signal.

Optionally, the robot further includes a connecting seat, where the connecting seat includes more than two first cascade sockets for more than two driver controller integrated boards to be plugged in, and all the more than two first cascade sockets are spaced apart and connected in cascade in sequence.

Optionally, the robot further includes a drive mechanism, where the drive mechanism is mounted on the base or the mechanical arm, the drive mechanism is electrically connected to the driver controller integrated board, and the drive mechanism is configured to drive the mechanical arm to move.

Optionally, the base is provided with an accommodation cavity, and the drive mechanism is mounted in the accommodation cavity.

Optionally, the drive mechanism includes a drive motor and a deceleration assembly, where the drive motor is mounted on the base or the mechanical arm, the deceleration assembly is mounted on the drive motor, and an output end of the drive motor is transmissively connected to the deceleration assembly.

Optionally, the drive mechanism further includes a flange, where the flange is mounted on the base or the mechanical arm, and the drive motor and the deceleration assembly are mounted on the flange.

Optionally, the drive mechanism is a drive device made of piezoelectric ceramic.

As an optional solution, the robot further includes a heat dissipation structure, where the heat dissipation structure is disposed on the control box.

Optionally, the heat dissipation structure uses air cooling heat dissipation.

As another optional solution, the heat dissipation structure uses liquid cooling heat dissipation.

Optionally, the heat dissipation structure includes a first cooling fan, where the first cooling fan is opposite to the driver controller integrated plate, and the first cooling fan is configured to accelerate diffusion of heat from the driver controller integrated plate to all regions within the control box and dissipate the heat to an outer side through an outer wall of the control box.

Optionally, the heat dissipation structure includes a second cooling fan, the control box is provided with a heat dissipation hole, the second cooling fan is opposite to the heat dissipation hole, and the second cooling fan is configured to discharge heat from an inner side of the control box to an outer side of the control box.

Optionally, the heat dissipation structure includes a heat sink, where the heat sink is disposed on an outer wall of the control box.

Optionally, the heat sink is disposed on the outer side and/or inner side of the outer wall of the control box.

Optionally, the driver controller integrated board is disposed near the outer wall on which the heat sink is disposed.

As an optional solution, the driver controller integrated board further includes a first communication module disposed on the substrate, where the first communication module is electrically connected to the control module.

As an optional solution, the first communication module is configured to be connected to a network.

As an optional solution, the first communication module is connected to the network in a wired or wireless manner.

Optionally, the control module includes a first control part and a second control part, where the first control part and the first communication module are disposed on a first side of the substrate, and the second control part and the drive module are disposed on a second side of the substrate.

As an optional solution, each of the at least two driver controller integrated boards further includes a first communication module disposed on the substrate, where the first communication module is electrically connected to the control module and/or the drive module, and different ones of the at least two driver controller integrated boards are connected to each other by signals from first communication modules of the different ones of the at least two driver controller integrated boards.

Optionally, the robot further includes a connecting plate, where the connecting plate and the at least two driver control integrated boards are spaced apart and stacked, the connecting plate is configured to control signals from all the at least two driver controller integrated boards and is connected to an external device signal, the connecting plate includes a third control part and a mounting plate, the third control part is disposed on the mounting plate, the more than two driver controller integrated boards are connected in cascade in sequence, and the third control part is electrically connected to at least one of the at least two driver controller integrated boards.

Optionally, the connecting plate further includes a second communication module, where the second communication module is disposed on the mounting plate, and the third control part is electrically connected to the second communication module and at least one of the at least two driver controller integrated boards.

Optionally, the second communication module is configured to be connected to a network.

Optionally, the second communication module is connected to the network in a wired or wireless manner.

Optionally, the robot further includes a connecting seat, where the connecting seat includes more than two first cascade sockets for the more than two driver controller integrated boards to be plugged in and one second cascade socket for the connecting plate to be plugged in, all the more than two first cascade sockets are spaced apart along a column and connected in cascade in sequence, and the second cascade socket is electrically connected to at least one of the more than two first cascade sockets.

As an optional solution, the robot further includes a control function board or a drive function board, where the control function board or the drive function board is disposed on the mechanical arm.

A robot is provided and includes a base, a mechanical arm, and a driver controller integrated board.

The mechanical arm is movably mounted on the base.

The driver controller integrated board includes a drive board and a control board, where the drive board and the control board are disposed on the base, the drive board is electrically connected to the control board, and the driver controller integrated board is configured to control the mechanical arm to move.

As an optional solution, more than two driver controller integrated boards are provided, the mechanical arm includes multiple arm bodies, all the more than two driver controller integrated boards are stacked and connected in cascade in sequence, and each of the more than two driver controller integrated boards controls at least one of the multiple arm bodies of the mechanical arm.

Optionally, one of the more than two driver controller integrated boards controls one of the multiple arm bodies of the mechanical arm. Optionally, the number of the driver controller integrated boards is equal to the number of the arm bodies of the mechanical arm.

As an optional solution, any of the at least two driver controller integrated boards is capable of acting as a master control board, and any of the at least two driver controller integrated boards is configured to control signals from all the at least two driver controller integrated boards and is connected to an external device signal; or all the at least two driver controller integrated boards are connected to a cloud controller, where the cloud controller is configured to control signals from all the at least two driver controller integrated boards and is connected to an external device signal.

As an optional solution, the drive board is connected to the control board in a daisy chain.

Optionally, the robot further includes a drive mechanism, where the drive mechanism is mounted on the base or the mechanical arm, the drive mechanism is electrically connected to the driver controller integrated board, and the drive mechanism is configured to drive the mechanical arm to move.

Optionally, the base is provided with an accommodation cavity, and the drive mechanism is mounted in the accommodation cavity.

Optionally, the drive mechanism includes a drive motor and a deceleration assembly, where the drive motor is mounted on the base or the mechanical arm, the deceleration assembly is mounted on the drive motor, and an output end of the drive motor is transmissively connected to the deceleration assembly.

Optionally, the drive mechanism further includes a flange, where the flange is mounted on the base or the mechanical arm, and the drive motor and the deceleration assembly are mounted on the flange.

Optionally, the drive mechanism is a drive device made of piezoelectric ceramic.

As an optional solution, the robot further includes a heat dissipation structure, where the heat dissipation structure is disposed on the base.

Optionally, the heat dissipation structure uses air cooling heat dissipation.

As another optional solution, the heat dissipation structure uses liquid cooling heat dissipation.

Optionally, the heat dissipation structure includes a first cooling fan, where the first cooling fan is opposite to the driver controller integrated plate, and the first cooling fan is configured to accelerate diffusion of heat from the driver controller integrated plate to all regions of the base and dissipate the heat to an outer side through a wall body of the base.

Optionally, the heat dissipation structure includes a second cooling fan, the base is provided with a heat dissipation hole, the second cooling fan is opposite to the heat dissipation hole, and the second cooling fan is configured to discharge heat from an inner side of the base to an outer side of the base.

Optionally, the heat dissipation structure includes a heat sink, where the heat sink is disposed on a wall body of the base.

Optionally, the heat sink is disposed on the outer side and/or inner side of the wall body of the base.

Optionally, the driver controller integrated board is disposed near the wall body on which the heat sink is disposed.

As an optional solution, the driver controller integrated board further includes a communication board, where the communication board is electrically connected to the control board.

As an optional solution, the communication board is configured to be connected to a network.

As an optional solution, the communication board is connected to the network in a wired or wireless manner.

As an optional solution, the driver controller integrated board further includes a communication board, where the communication board is electrically connected to the control board, and different driver controller integrated boards are connected to each other by signals from communication boards of the different driver controller integrated boards.

Optionally, the robot further includes a connecting plate, where the connecting plate and the driver control integrated boards are stacked, the connecting plate is configured to control signals from all the driver controller integrated boards and is connected to an external device signal, the connecting plate includes a control part and a mounting plate, the control part is disposed on the mounting plate, the more than two driver controller integrated boards are connected in cascade in sequence, and the control part is electrically connected to at least one driver controller integrated board.

Optionally, the connecting plate further includes a communication module, where the communication module is disposed on the mounting plate, and the control part is electrically connected to the communication module and the driver controller integrated board.

Optionally, the communication module is configured to be connected to a network.

Optionally, the communication module is connected to the network in a wired or wireless manner.

As an optional solution, the base is provided with an accommodation cavity, and the driver controller integrated board is disposed in the accommodation cavity; or a control box is mounted on an outer side of a wall body of the base, and the driver controller integrated board is disposed in the control box.

As an optional solution, the robot further includes a control function board or a drive function board, where the control function board or the drive function board is disposed on the mechanical arm.

BRIEF DESCRIPTION OF DRAWINGS

The present application is described below according to drawings and embodiments.

REFERENCE LIST

Figure 1:
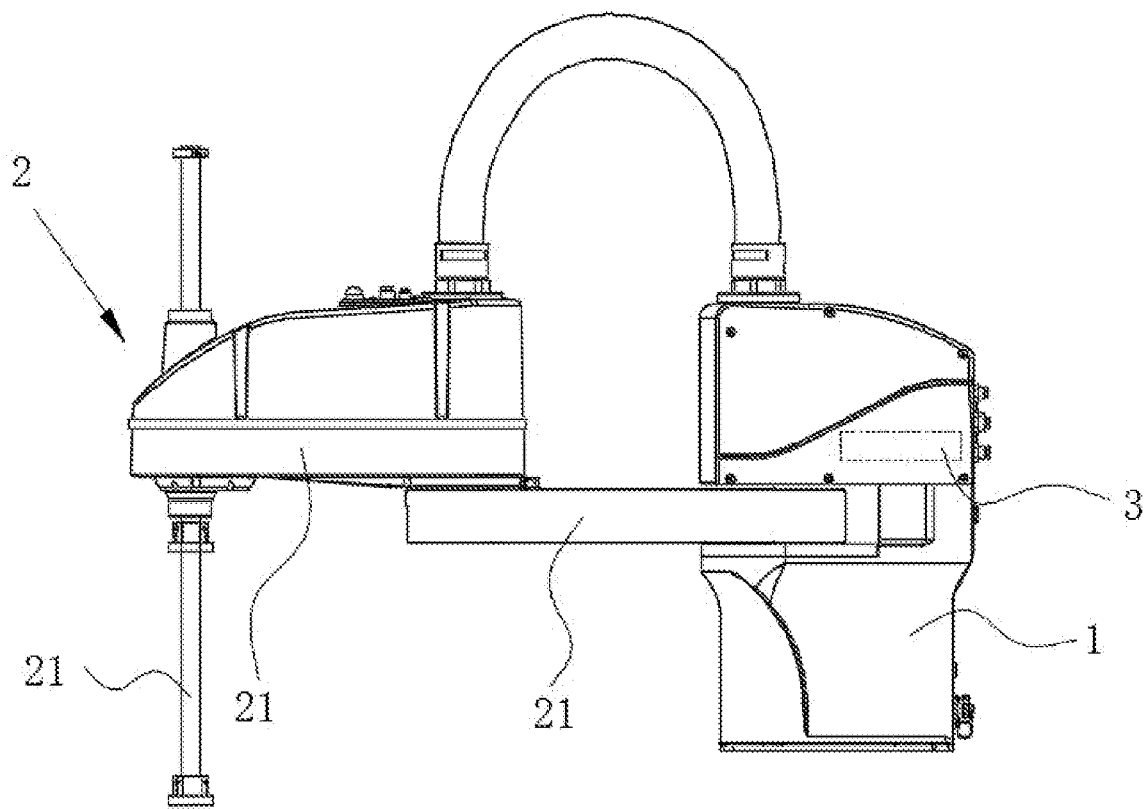
FIG. 1 is a first structural view of a robot according to an embodiment.

1 base
2 mechanical arm
21 arm body
3 driver controller integrated board
31 control module
311 first control part
312 second control part
32 drive module
33 substrate
34 first communication module
35 control board
36 drive board
4 connecting seat
41 first cascade socket
42 second cascade socket
5 drive mechanism
51 drive motor
52 deceleration assembly
53 flange
6 connecting plate
61 third control part
62 mounting plate
63 second communication module
7 control box

DETAILED DESCRIPTION

Technical solutions in embodiments of the present application are described below in conjunction with the drawings. Apparently, the described embodiments are merely part, not all of the embodiments of the present application.

In the description of the present application, the terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two elements", or "interaction relations between two elements". For those of ordinary skill in the art, specific meanings of the preceding terms in the present application may be understood based on situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

The technical solutions of the present application are described hereinafter in conjunction with drawings and embodiments.

Embodiment One

Figure 2:
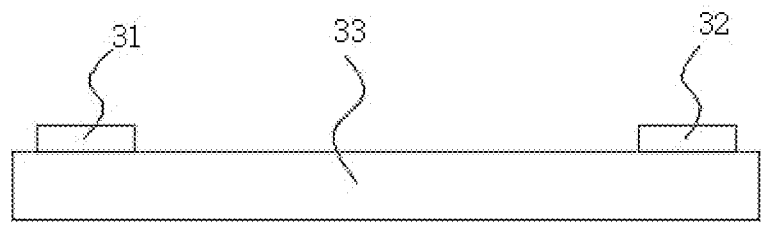
FIG. 2 is a structural diagram of a driver controller integrated board according to an embodiment.

A robot is shown in FIGS. 1 and 2 (FIG. 1 is only a selective compliance assembly robot arm (SCARA) robot; in fact, this art is not limited to robots of the shape, structure, or model shown in FIG. 1, nor is it limited to the category of SCARA robots; this art may also be other categories of robots, such as a two-shaft robot, a three-shaft robot, a four-shaft robot, a five-shaft robot, a six-shaft robot, a multi-shaft robot, and a Delta robot and is applicable to a variety of shapes, structures, and models of the two-shaft robot, three-shaft robot, four-shaft robot, five-shaft robot, six-shaft robot, multi-shaft robot, and Delta robot). The robot includes a base 1, a mechanical arm 2, and a driver controller integrated board 3. The mechanical arm 2 is movably mounted on the base 1. The driver controller integrated board 3 is disposed on the base 1, is configured to control the mechanical arm 2 to move, and includes a control module 31, a drive module 32, and a substrate 33. The control module 31 and the drive module 32 are disposed on the substrate 33. The control module 31 is electrically connected to the drive module 32. The control module 31 and the drive module 32 are disposed on the same substrate 33 so that the overall structure of the control module 31 and the drive module 32 is more compact, less installation space is required, and the overall structure of the robot is more compact.

Optionally, at least two driver controller integrated boards 3 are provided, all the driver controller integrated boards 3 are spaced apart, stacked, and connected in cascade in sequence, and each driver controller integrated board 3 controls at least one arm body 21 of the mechanical arm 2. One driver controller integrated board 3 controls one arm body 21 of the mechanical arm 2. The number of the driver controller integrated boards 3 is equal to the number of arm bodies 21 of the mechanical arm 2.

Optionally, any driver controller integrated board 3 can act as a master control board, and any driver controller integrated board 3 is configured to control the signals from all the driver controller integrated boards 3 and is connected to an external device signal. Through the preceding design, a control system of the robot can be more flexible and the whole robot unable to work due to the damage of a main control board can be avoided. When one driver controller integrated board 3 is damaged, another driver controller integrated board 3 can be used as the main control board to achieve the overall control of the robot.

Figure 3:
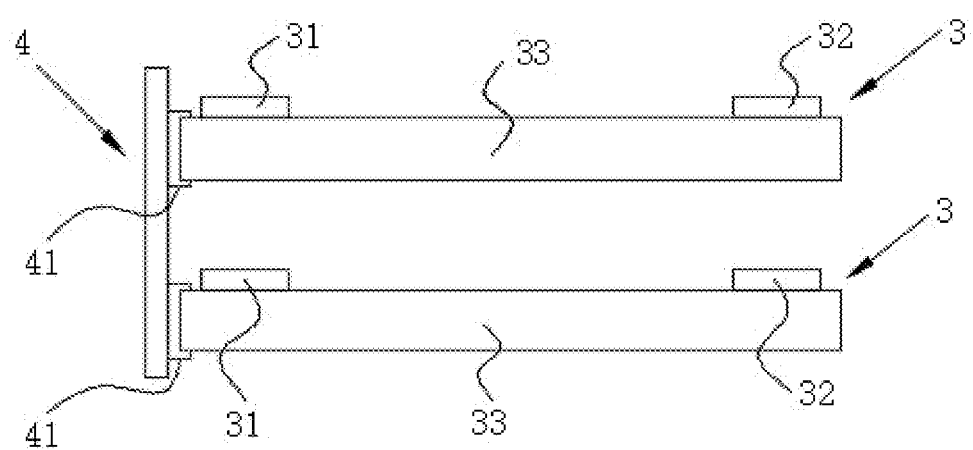
FIG. 3 is a structural diagram of more than two driver controller integrated boards according to an embodiment.

Optionally, as shown in FIG. 3, the robot further includes a connecting seat 4, where the connecting seat 4 includes more than two first cascade sockets 41 for more than two driver controller integrated boards 3 to be plugged in, and all the first cascade sockets 41 are spaced apart and connected in cascade in sequence. The connecting seat 4 with the first cascade sockets 41 is provided. Therefore, on the one hand, the installation reliability of the driver controller integrated board 3 can be improved; on the other hand, the quick assembly and disassembly of the driver controller integrated board and the connecting seat 4 can be facilitated, thereby improving the convenience and flexibility of using different driver controller integrated boards 3 in combination.

Figure 4:
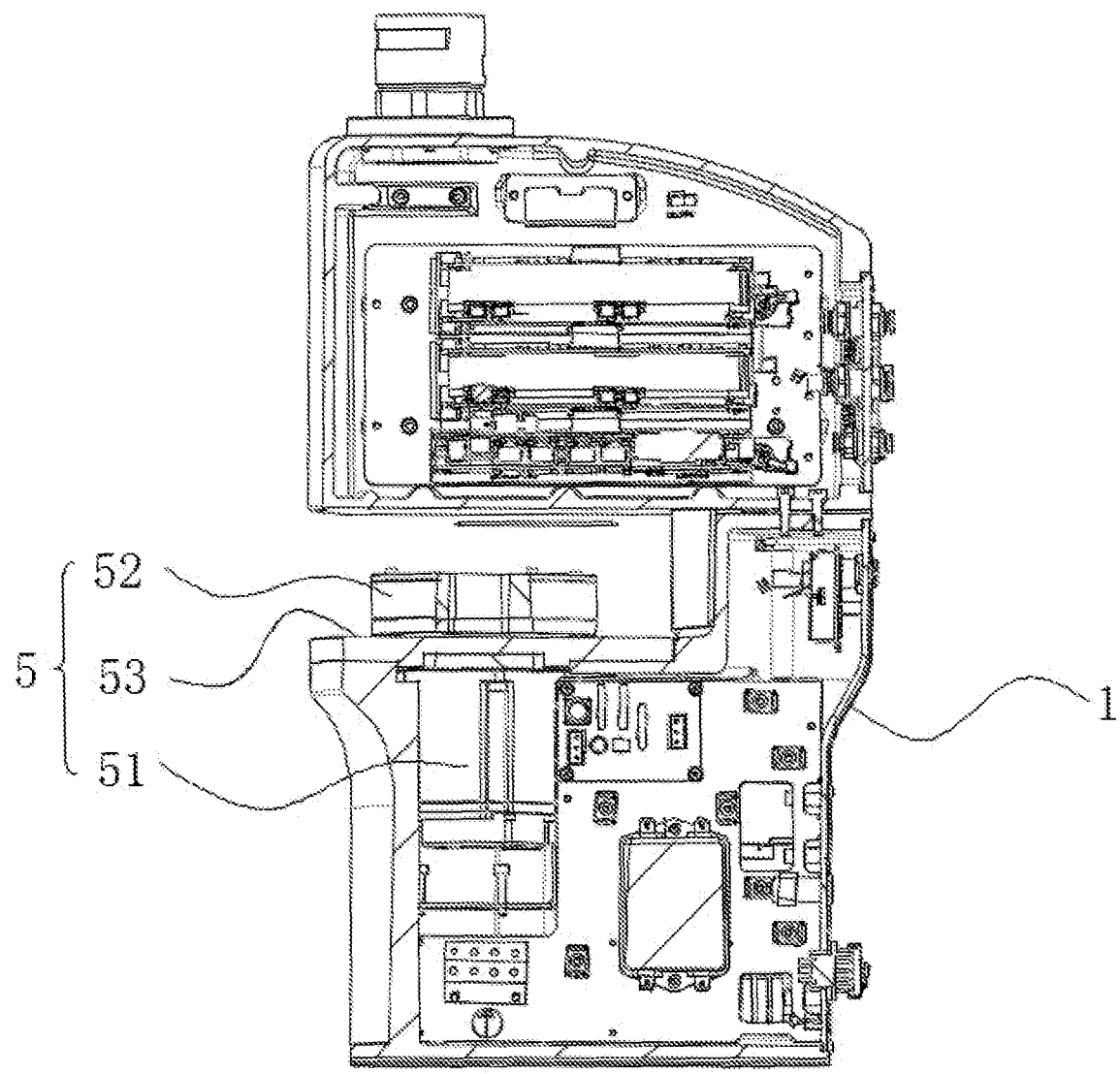
FIG. 4 is a structural view of a base and a drive mechanism according to an embodiment.

Optionally, as shown in FIG. 4, the robot further includes a drive mechanism 5, the drive mechanism 5 is mounted on the base 1, the drive mechanism 5 is electrically connected to the driver controller integrated board 3, and the drive mechanism 5 is configured to drive the mechanical arm 2 to move. The base 1 is provided with an accommodation cavity, and the drive mechanism 5 is mounted in the accommodation cavity. The drive mechanism 5 is disposed in the accommodation cavity so that the connection between the drive mechanism 5 and the driver controller integrated board 3 can be simpler and more reliable.

Optionally, the drive mechanism 5 includes a drive motor 51 and a deceleration assembly 52, the drive motor 51 is mounted on the base 1, the deceleration assembly 52 is mounted on the drive motor 51, and the output end of the drive motor 51 is transmissively connected to the deceleration assembly 52.

Optionally, the drive motor 51 of the drive mechanism 5 is connected to the drive module 32 of the driver controller integrated board 3, the control module 31 sends a control signal to the drive module 32, the drive module 32 outputs a drive signal to the drive motor 51 according to the control signal, and the drive motor 51 drives the deceleration assembly according to the drive signal to drive the mechanical arm to move.

The drive mechanism 5 further includes a flange 53, where the flange 53 is mounted on the base 1, and the drive motor 51 and the deceleration assembly 52 are mounted on the flange 53. The flange 53 is not necessary, and in some cases, the flange 53 may not be provided.

Optionally, the base 1 is provided with an opening, the flange 53 is disposed at the opening of the base 1 and is disposed on the base 1, and the deceleration assembly 52 is disposed on the drive motor 51 through the flange 53.

Optionally, the robot further includes a heat dissipation structure, where the heat dissipation structure is disposed on the base 1.

Optionally, the heat dissipation structure uses air cooling heat dissipation.

The heat dissipation structure includes a first cooling fan, where the first cooling fan is opposite to the driver controller integrated plate 3, and the first cooling fan is configured to accelerate the diffusion of heat from the driver controller integrated plate 3 to all regions within the base 1 and dissipate the heat to the outer side through the wall body of the base 1. Optionally, the base 1 is provided with an accommodation cavity, and the driver controller integrated board 3 and the heat dissipation structure are both disposed in the accommodation cavity.

The heat dissipation structure includes a second cooling fan, the base 1 is provided with a heat dissipation hole, the second cooling fan is opposite to the heat dissipation hole, and the second cooling fan is configured to discharge the heat from the inner side of the base 1 to the outer side of the base 1. Optionally, the base 1 is provided with an accommodation cavity, and the driver controller integrated board 3 and the heat dissipation structure are both disposed in the accommodation cavity.

The first cooling fan and the second cooling fan are not necessarily provided at the same time, and in some cases, only one of the first cooling fan and the second cooling fan may be provided separately.

Optionally, the heat dissipation structure includes a heat sink, where the heat sink is disposed on the wall body of the base 1. The heat sink is disposed on the outer side and/or inner side of the wall body of the base 1, and the driver controller integrated board 3 is disposed near the wall body on which the heat sink is disposed. This design can improve the heat dissipation effect of the driver controller integrated board 3.

Figure 5:
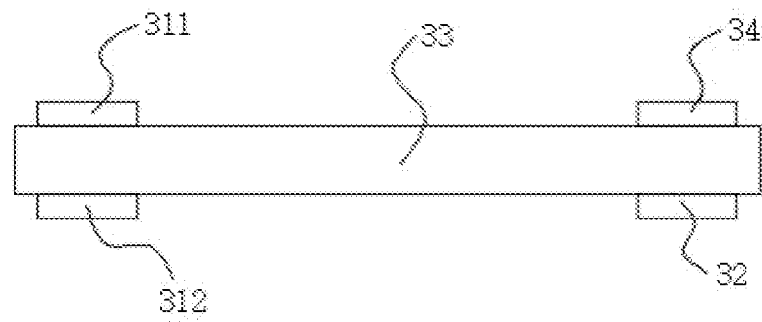
FIG. 5 is another structural diagram of a driver controller integrated board according to an embodiment.

Optionally, as shown in FIG. 5, the driver controller integrated board 3 further includes a first communication module 34 disposed on the substrate 33, where the first communication module 34 is electrically connected to the control module 31. The first communication module 34 is configured to be connected to the network. The first communication module 34 is connected to the network in a wired or wireless manner. When more than two driver controller integrated boards 3 are provided, different driver controller integrated boards 3 are connected to each other by the signals from first communication modules 34 of the different driver controller integrated boards 3.

Optionally, the control module 31 includes a first control part 311 and a second control part 312, where the first control part 311 and the first communication module 34 are disposed on the first side of the substrate 33, and the second control part 312 and the drive module 32 are disposed on the second side of the substrate 33.

Optionally, the first control part 311 is electrically connected to the second control part 312, and the first control part 311 and/or the second control part 312 are electrically connected to the drive module 32.

Optionally, the base 1 is provided with an accommodation cavity, and the driver controller integrated board 3 is disposed in the accommodation cavity.

Optionally, the robot further includes a control function board or a drive function board, where the control function board or the drive function board is disposed on the mechanical arm 2. In the preceding manner, the separate control function board or drive function board may be disposed on the mechanical arm 2 so that the driver controller integrated board 3 and the control function board or the drive function board control the mechanical arm 2 to move. For example, the drive function board is disposed on one arm body 21 of the mechanical arm 2, the drive function board is connected to the control module 31 of the driver controller integrated board 3, the drive function board and the control module 31 control at least one arm body 21 to move, and the control module 31 and the drive module 32 control other arm bodies 21 to move. Alternatively, the control function board is disposed on one arm body 21 of the mechanical arm 2, the control function board is electrically connected to the drive module 32 of the driver controller integrated board 3, the control function board and the drive module 32 control all the arm bodies 21 to move, and the control module 31 and the drive module 32 may also control all the arm bodies 21 to move. Alternatively, the control function board and the drive function board are disposed on one arm body 21 of the mechanical arm 2, or the control function board is disposed on one arm body 21 of the mechanical arm 2 and the drive function board is disposed on another arm body 21, the control function board and the drive function board are electrically connected, the control function board and the drive function board control at least one arm body 21 to move, and the control module 31 and the drive module 32 may control other arm bodies 21 to move.

Embodiment Two

This embodiment differs from embodiment one in the aspect described below.

All the driver controller integrated boards are configured to be connected to a cloud controller, where the cloud controller is configured to control the signals from all the driver controller integrated boards and is connected to the external device signal. That is, none of the driver controller integrated board in this embodiment needs to be used as the master control board, and the cloud controller is used as a master control center of the robot to achieve the overall control of the robot.

Embodiment Three

This embodiment differs from embodiment one in the aspect described below.

The drive mechanism is not mounted in the accommodation cavity, and the drive mechanism in this embodiment is mounted on the mechanical arm. This design can make full use of the space in the height direction so that the robot is dispersed along the vertical direction, the drive mechanism is prevented from occupying the space of the base, the base can be designed smaller, and the robot can be applied to scenarios with a smaller horizontal area.

Embodiment Four

This embodiment differs from embodiment one in the aspect described below.

The drive mechanism is not mounted in the accommodation cavity, but rather the drive mechanism is mounted on the outer side of the wall body of the base, thereby facilitating the heat dissipation and maintenance of the drive mechanism.

Embodiment Five

This embodiment differs from embodiment one in the aspect described below.

The drive mechanism is not an electric motor structure, but a drive device made of piezoelectric ceramic, and the piezoelectric ceramic drive device drives the mechanical arm to move.

Embodiment Six

This embodiment differs from embodiment one in the aspect described below.

The heat dissipation structure in this embodiment uses liquid cooling heat dissipation. A liquid flow channel and a liquid flow pump may be provided, the liquid flow channel can exchange heat with the driver controller integrated board, and the liquid flow pump can drive the coolant to circulate in the liquid flow channel and then take away the heat from the driver controller integrated board so that the temperature of the driver controller integrated board can be reduced and the driver controller integrated board can work more stably.

Embodiment Seven

This embodiment differs from embodiment one in the aspects described below.

Figure 6:
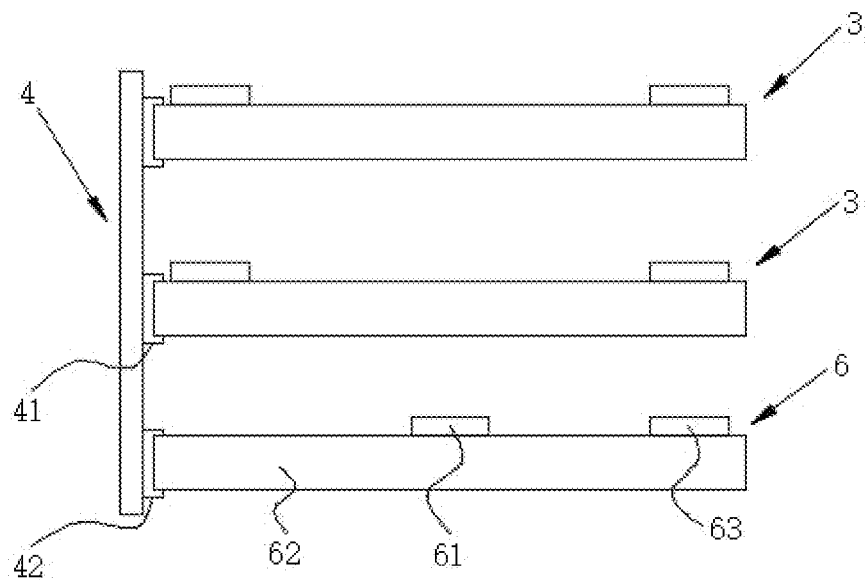
FIG. 6 is a structural diagram of a driver controller integrated board and a connecting plate according to an embodiment.

The robot further includes a connecting plate 6, where the connecting plate 6 and the driver control integrated boards 3 are spaced apart and stacked, and the connecting plate 6 is configured to control the signals from all the driver controller integrated boards 3 and is connected to the external device signal. As shown in FIG. 6, the connecting plate 6 includes a third control part 61 and a mounting plate 62, the third control part 61 is disposed on the mounting plate 62, multiple driver controller integrated boards 3 are connected in cascade in sequence, and the third control part 61 is electrically connected to at least one driver controller integrated board 3. The connecting plate 6 further includes a second communication module 63, where the second communication module 63 is disposed on the mounting plate 62, and the third control part 61 is electrically connected to the second communication module 63 and at least one driver controller integrated board 3. The second communication module 63 is configured to be connected to the network, and the second communication module 63 is connected to the network in a wired or wireless manner. The connecting plate 6 can act as the master control board of the robot and control all the driver controller integrated boards 3 as a whole, that is, there is no need to use any driver controller integrated board 3 as the master control board. The second communication module 63 enables the remote interaction of the third control part 61 with the external device.

Optionally, the robot further includes a connecting seat 4, where the connecting seat 4 includes more than two first cascade sockets 41 for the more than two driver controller integrated boards 3 to be plugged in and one second cascade socket 42 for the connecting plate 6 to be plugged in, all the first cascade sockets 41 are spaced apart along a column and connected in cascade in sequence, and the second cascade socket 42 is electrically connected to at least one first cascade socket 41.

Embodiment Eight

This embodiment differs from embodiment one in the aspect described below.

A control box is mounted on the outer side of a wall body 21 of the base 1, and the driver controller integrated board 3 is disposed in the control box. Compared with the solution in which the driver controller integrated board 3 is disposed in the accommodation cavity of the base 1, in this design, the control system composed of the driver controller integrated board 3 and other devices can act as a whole and is convenient to assemble and disassemble.

Embodiment Nine

Figure 7:
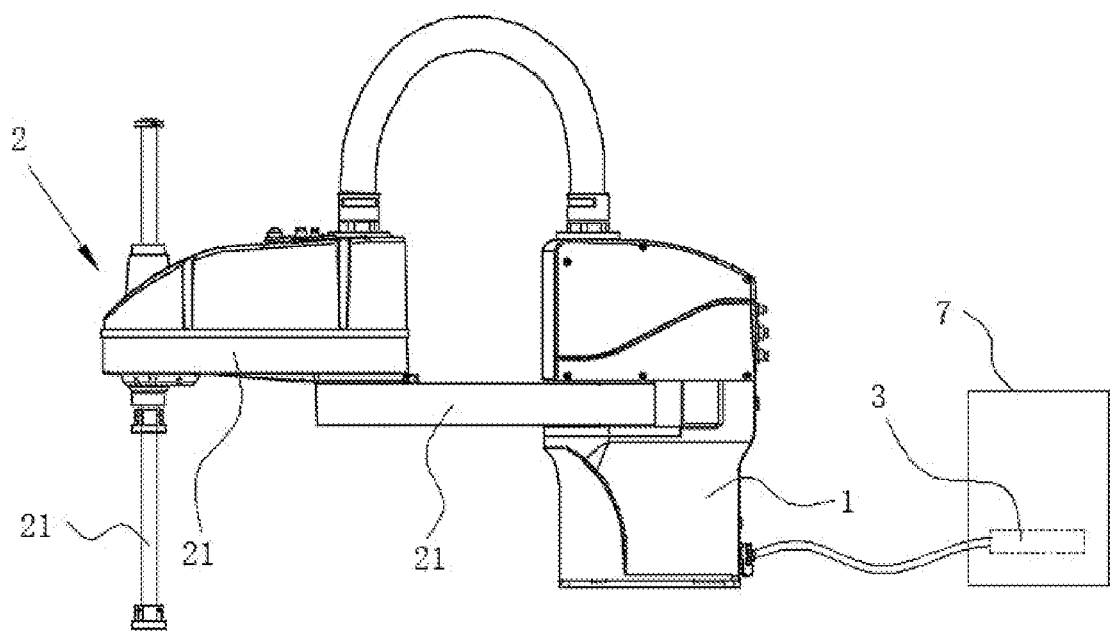
FIG. 7 is a second structural view of a robot according to an embodiment.

A robot is shown in FIG. 7 (FIG. 7 is only a SCARA robot; in fact, this art is not limited to robots of the shape, structure, or model shown in FIG. 1, nor is it limited to the category of SCARA robots; this art may also be other categories of robots, such as a two-shaft robot, a three-shaft robot, a four-shaft robot, a five-shaft robot, a six-shaft robot, a multi-shaft robot, and a Delta robot and is applicable to a variety of shapes, structures, and models of the two-shaft robot, three-shaft robot, four-shaft robot, five-shaft robot, six-shaft robot, multi-shaft robot, and Delta robot). The robot includes the base 1, the mechanical arm 2, a control box 7, and the driver controller integrated board 3. The mechanical arm 2 is movably mounted on the base 1. The control box 7 is spaced apart from the base 1. The driver controller integrated board 3 is disposed in the control box 7 and configured to control the mechanical arm 2 to move. As shown in FIG. 2, the driver controller integrated board 3 includes the control module 31, the drive module 32, and the substrate 33, where the control module 31 and the drive module 32 are disposed on the substrate 33, and the control module 31 is electrically connected to the drive module 32. This split design of the control box 7 and the base 1 enables the control box 7 to be mounted away from the base 1, making it convenient for the base 1 to be used in narrow spaces.

Optionally, at least two driver controller integrated boards 3 are provided, all the driver controller integrated boards 3 are spaced apart, stacked, and connected in cascade in sequence, and each driver controller integrated board 3 controls at least one arm body 21 of the mechanical arm 2.

Optionally, one driver controller integrated board 3 controls one arm body 21 of the mechanical arm 2. The number of the driver controller integrated boards 3 is equal to the number of arm bodies 21 of the mechanical arm 2.

Optionally, any driver controller integrated board 3 can act as the master control board, and any driver controller integrated board 3 is configured to control the signals from all the driver controller integrated boards 3 and is connected to the external device signal.

Optionally, as shown in FIG. 3, the robot further includes the connecting seat 4, where the connecting seat 4 includes more than two first cascade sockets 41 for more than two driver controller integrated boards 3 to be plugged in, and all the first cascade sockets 41 are spaced apart and connected in cascade in sequence.

Optionally, as shown in FIG. 4, the robot further includes the drive mechanism 5, the drive mechanism 5 is mounted on the base 1 or the mechanical arm 2, the drive mechanism 5 is electrically connected to the driver controller integrated board 3, and the drive mechanism 5 is configured to drive the mechanical arm 2 to move.

Optionally, the base 1 is provided with an accommodation cavity, and the drive mechanism 5 is mounted in the accommodation cavity.

Optionally, the drive mechanism 5 includes the drive motor 51 and the deceleration assembly 52, the drive motor 51 is mounted on the base 1 or the mechanical arm 2, the deceleration assembly 52 is mounted on the drive motor 51, and the output end of the drive motor 51 is transmissively connected to the deceleration assembly 52.

Optionally, the drive motor 51 of the drive mechanism 5 is connected to the drive module 32 of the driver controller integrated board 3, the control module 31 sends a control signal to the drive module 32, the drive module 32 outputs a drive signal to the drive motor 51 according to the control signal, and the drive motor 51 drives the deceleration assembly according to the drive signal to drive the mechanical arm to move.

Optionally, the drive mechanism 5 further includes the flange 53, where the flange 53 is mounted on the base 1 or the mechanical arm 2, and the drive motor 51 and the deceleration assembly 52 are mounted on the flange 53.

Optionally, the base 1 is provided with an opening, the flange 53 is disposed at the opening of the base 1 and is disposed on the base 1, and the deceleration assembly 52 is disposed on the drive motor 51 through the flange 53.

Optionally, the drive mechanism 5 may not be an electric motor structure, but a drive device made of piezoelectric ceramic.

In this embodiment, the robot further includes a heat dissipation structure, where the heat dissipation structure is disposed on the control box 7. The heat dissipation structure uses air cooling heat dissipation. In other embodiments, the heat dissipation structure may use liquid cooling heat dissipation.

In the case of air cooling heat dissipation, optionally, the heat dissipation structure includes a first cooling fan, where the first cooling fan is opposite to the driver controller integrated plate 3, and the first cooling fan is configured to accelerate the diffusion of heat from the driver controller integrated plate 3 to all regions within the control box 7 and dissipate the heat to the outer side through the outer wall of the control box. The heat dissipation structure includes a second cooling fan, the control box 7 is provided with a heat dissipation hole, the second cooling fan is opposite to the heat dissipation hole, and the second cooling fan is configured to discharge the heat from the inner side of the control box 7 to the outer side of the control box 7.

The first cooling fan and the second cooling fan are not necessarily provided at the same time, and in some cases, only one of the first cooling fan and the second cooling fan may be provided separately.

Optionally, the heat dissipation structure includes a heat sink, where the heat sink is disposed on the outer wall of the control box 7. The heat sink is disposed on the outer side and/or inner side of the outer wall of the control box 7, and the driver controller integrated board 3 is disposed near the outer wall on which the heat sink is disposed.

Optionally, as shown in FIG. 5, the driver controller integrated board 3 further includes the first communication module 34 disposed on the substrate 33, where the first communication module 34 is electrically connected to the control module 31. The first communication module 34 is configured to be connected to the network. The first communication module 34 is connected to the network in a wired or wireless manner. When more than two driver controller integrated boards 3 are provided, different driver controller integrated boards 3 are connected to each other by the signals from first communication modules 34 of the different driver controller integrated boards 3.

Optionally, the control module 31 includes the first control part 311 and the second control part 312, where the first control part 311 and the first communication module 34 are disposed on the first side of the substrate 33, and the second control part 312 and the drive module 32 are disposed on the second side of the substrate 33.

Optionally, the first control part 311 is electrically connected to the second control part 312, and the first control part 311 and/or the second control part 312 are electrically connected to the drive module 32.

Optionally, the robot further includes a control function board or a drive function board, where the control function board or the drive function board is disposed on the mechanical arm 2. In the preceding manner, the separate control function board or drive function board may be disposed on the mechanical arm 2 so that the driver controller integrated board 3 and the control function board or the drive function board control the mechanical arm 2 to move. For example, the drive function board is disposed on one arm body 21 of the mechanical arm 2, the drive function board is connected to the control module 31 of the driver controller integrated board 3, the drive function board and the control module 31 control at least one arm body 21 to move, and the control module 31 and the drive module 32 control other arm bodies 21 to move. Alternatively, the control function board is disposed on one arm body 21 of the mechanical arm 2, the control function board is electrically connected to the drive module 32 of the driver controller integrated board 3, the control function board and the drive module 32 control all the arm bodies 21 to move, and the control module 31 and the drive module 32 may also control all the arm bodies 21 to move. Alternatively, the control function board and the drive function board are disposed on one arm body 21 of the mechanical arm 2, or the control function board is disposed on one arm body 21 of the mechanical arm 2 and the drive function board is disposed on another arm body 21, the control function board and the drive function board are electrically connected, the control function board and the drive function board control at least one arm body 21 to move, and the control module 31 and the drive module 32 may control other arm bodies 21 to move.

Embodiment Ten

This embodiment differs from embodiment nine in the aspects described below.

The robot further includes the connecting plate 6, where the connecting plate 6 and the driver control integrated boards 3 are spaced apart and stacked, and the connecting plate 6 is configured to control the signals from all the driver controller integrated boards 3 and is connected to the external device signal. As shown in FIG. 6, the connecting plate 6 includes the third control part 61 and the mounting plate 62, the third control part 61 is disposed on the mounting plate 62, multiple driver controller integrated boards 3 are connected in cascade in sequence, and the third control part 61 is electrically connected to at least one driver controller integrated board 3. The connecting plate 6 further includes the second communication module 63, where the second communication module 63 is disposed on the mounting plate 62, and the third control part 61 is electrically connected to the second communication module 63 and at least one driver controller integrated board 3. The second communication module 63 is configured to be connected to the network. The second communication module 63 is connected to the network in a wired or wireless manner. In this embodiment, the connecting plate 6 acts as the master control board and controls all the driver controller integrated boards 3 as a whole, that is, there is no need to use any driver controller integrated board 3 as the master control board. The second communication module 63 enables the remote interaction of the third control part 61 with the external device.

Optionally, the robot further includes the connecting seat 4, where the connecting seat 4 includes more than two first cascade sockets 41 for the more than two driver controller integrated boards 3 to be plugged in and one second cascade socket 42 for the connecting plate 6 to be plugged in, all the first cascade sockets 41 are spaced apart along a column and connected in cascade in sequence, and the second cascade socket 42 is electrically connected to at least one first cascade socket 41.

Embodiment Eleven

This embodiment differs from embodiment nine in the aspect described below.

All the driver controller integrated boards are configured to be connected to a cloud controller, where the cloud controller is configured to control the signals from all the driver controller integrated boards and is connected to the external device signal. That is, none of the driver controller integrated board in this embodiment needs to be used as the master control board, and the cloud controller is used as the master control center of the robot to achieve the overall control of the robot.

Embodiment Twelve

Figure 8:
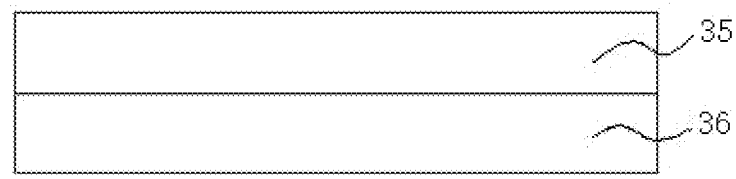
FIG. 8 is another structural diagram of a driver controller integrated board according to an embodiment.

A robot is shown in FIGS. 1 and 8 (FIG. 1 is only a SCARA robot; in fact, this art is not limited to robots of the shape, structure, or model shown in FIG. 1, nor is it limited to the category of SCARA robots; this art may also be other categories of robots, such as a two-shaft robot, a three-shaft robot, a four-shaft robot, a five-shaft robot, a six-shaft robot, a multi-shaft robot, and a Delta robot and is applicable to a variety of shapes, structures, and models of the two-shaft robot, three-shaft robot, four-shaft robot, five-shaft robot, six-shaft robot, multi-shaft robot, and Delta robot). The robot includes the base 1, the mechanical arm 2, and the driver controller integrated board 3. The mechanical arm 2 is movably mounted on the base 1. The driver controller integrated board 3 includes a drive board 36 and a control board 35, where the drive board 36 and the control board 35 are disposed on the base 1, the drive board 36 is electrically connected to the control board 35, and the driver controller integrated board 3 is configured to control the mechanical arm 2 to move. The design of the control board 35 and the drive board 36 as an integrated structure enables the overall structure of the drive board 36 and the control board 35 to be more compact, less installation space is required, and the overall structure of the robot is more compact. Optionally, the drive board 36 is connected to the control board 35 in a daisy chain.

Optionally, at least two driver controller integrated boards 3 are provided, all the driver controller integrated boards 3 are stacked and connected in cascade in sequence, and each driver controller integrated board 3 controls at least one arm body 21 of the mechanical arm 2.

Optionally, one driver controller integrated board 3 controls one arm body 21 of the mechanical arm 2. The number of the driver controller integrated boards 3 is equal to the number of arm bodies 21 of the mechanical arm 2.

Optionally, any driver controller integrated board 3 can act as the master control board, and any driver controller integrated board 3 is configured to control the signals from all the driver controller integrated boards 3 and is connected to the external device signal.

Optionally, the robot further includes the drive mechanism 5, the drive mechanism 5 is mounted on the base 1 or the mechanical arm 2, the drive mechanism 5 is electrically connected to the driver controller integrated board 3, and the drive mechanism 5 is configured to drive the mechanical arm 2 to move.

Optionally, the base 1 is provided with an accommodation cavity, and the drive mechanism 5 is mounted in the accommodation cavity.

Optionally, the drive mechanism 5 includes the drive motor 51 and the deceleration assembly 52, the drive motor 51 is mounted on the base 1 or the mechanical arm 2, the deceleration assembly 52 is mounted on the drive motor 51, and the output end of the drive motor 51 is transmissively connected to the deceleration assembly 52.

Optionally, the drive motor 51 of the drive mechanism 5 is connected to the drive module 32 of the driver controller integrated board 3, the control module 31 sends a control signal to the drive module 32, the drive module 32 outputs a drive signal to the drive motor 51 according to the control signal, and the drive motor 51 drives the deceleration assembly according to the drive signal to drive the mechanical arm to move.

Optionally, the drive mechanism 5 further includes the flange 53, where the flange 53 is mounted on the base 1 or the mechanical arm 2, and the drive motor 51 and the deceleration assembly 52 are mounted on the flange 53.

Optionally, the base 1 is provided with an opening, the flange 53 is disposed at the opening of the base 1 and is disposed on the base 1, and the deceleration assembly 52 is disposed on the drive motor 51 through the flange 53. Optionally, in some embodiments, the drive mechanism 5 may not be an electric motor structure, but a drive device made of piezoelectric ceramic.

Optionally, the robot further includes a heat dissipation structure, where the heat dissipation structure is disposed on the base 1. The heat dissipation structure uses air cooling heat dissipation. In some embodiments, the heat dissipation structure may use liquid cooling heat dissipation.

In the case of air cooling heat dissipation, optionally, the heat dissipation structure includes a first cooling fan, where the first cooling fan is opposite to the driver controller integrated plate 3, and the first cooling fan is configured to accelerate the diffusion of heat from the driver controller integrated plate 3 to all regions of the base 1 and dissipate the heat to the outer side through the wall body of the base 1. Optionally, the base 1 is provided with an accommodation cavity, and the driver controller integrated board 3 and the heat dissipation structure are both disposed in the accommodation cavity.

The heat dissipation structure includes a second cooling fan, the base 1 is provided with a heat dissipation hole, the second cooling fan is opposite to the heat dissipation hole, and the second cooling fan is configured to discharge the heat from the inner side of the base 1 to the outer side of the base 1. Optionally, the base 1 is provided with an accommodation cavity, and the driver controller integrated board 3 and the heat dissipation structure are both disposed in the accommodation cavity.

The first cooling fan and the second cooling fan are not necessarily provided at the same time, and in some cases, only one of the first cooling fan and the second cooling fan may be provided separately.

Optionally, the heat dissipation structure includes a heat sink, where the heat sink is disposed on the wall body of the base 1. The heat sink is disposed on the outer side and/or inner side of the wall body 21 of the base 1, and the driver controller integrated board 3 is disposed near the wall body on which the heat sink is disposed.

Optionally, the driver controller integrated board 3 further includes a communication board, where the communication board is electrically connected to the control board 35. The communication board is configured to be connected to the network. The communication board is connected to the network in a wired or wireless manner. When more than two driver controller integrated boards 3 are provided, different driver controller integrated boards 3 are connected to each other by the signals from communication boards of the different driver controller integrated boards 3.

Optionally, the base 1 is provided with an accommodation cavity, and the driver controller integrated board 3 is disposed in the accommodation cavity; or the control box 7 is mounted on the outer side of the wall body of the base 1, and the driver controller integrated board 3 is disposed in the control box 7.

Optionally, the robot further includes a control function board or a drive function board, where the control function board or the drive function board is disposed on the mechanical arm 2. In the preceding manner, the separate control function board or drive function board may be disposed on the mechanical arm 2 so that the driver controller integrated board 3 and the control function board or the drive function board control the mechanical arm 2 to move. For example, the drive function board is disposed on one arm body 21 of the mechanical arm 2, the drive function board is connected to the control board 35 of the driver controller integrated board 3, the drive function board and the control board 35 control at least one arm body 21 to move, and the control board 35 and the drive board 36 control other arm bodies 21 to move. Alternatively, the control function board is disposed on one arm body 21 of the mechanical arm 2, the control function board is electrically connected to the drive board 36 of the driver controller integrated board 3, the control function board and the drive board 36 control all the arm bodies 21 to move, and the control board 35 and the drive board 36 may also control all the arm bodies 21 to move.

Alternatively, the control function board and the drive function board are disposed on one arm body 21 of the mechanical arm 2, or the control function board is disposed on one arm body 21 of the mechanical arm 2 and the drive function board is disposed on another arm body 21, the control function board and the drive function board are electrically connected, the control function board and the drive function board control at least one arm body 21 to move, and the control board 35 and the drive board 36 may control other arm bodies 21 to move.

Embodiment Thirteen

This embodiment differs from embodiment twelve in the aspect described below.

The robot further includes a connecting plate, where the connecting plate and the driver control integrated boards are stacked, the connecting plate is configured to control the signals from all the driver controller integrated boards and is connected to the external device signal, the connecting plate includes a control part and a mounting plate, the control part is disposed on the mounting plate, multiple driver controller integrated boards are connected in cascade in sequence, and the control part is electrically connected to at least one driver controller integrated board. The connecting plate further includes a communication module, where the communication module is disposed on the mounting plate, and the control part is electrically connected to the communication module and the driver controller integrated board. The communication module is configured to be connected to the network. The communication module is connected to the network in a wired or wireless manner. In this embodiment, the connecting plate acts as the master control board and controls all the driver controller integrated boards as a whole, that is, there is no need to use any driver controller integrated board as the master control board.

Embodiment Fourteen

This embodiment differs from embodiment twelve in the aspect described below.

All the driver controller integrated boards are configured to be connected to a cloud controller, where the cloud controller is configured to control the signals from all the driver controller integrated boards and is connected to the external device signal. That is, none of the driver controller integrated board in this embodiment needs to be used as the master control board, and the cloud controller is used as the master control center of the robot to achieve the overall control of the robot.

Embodiment Fifteen

Figure 9:
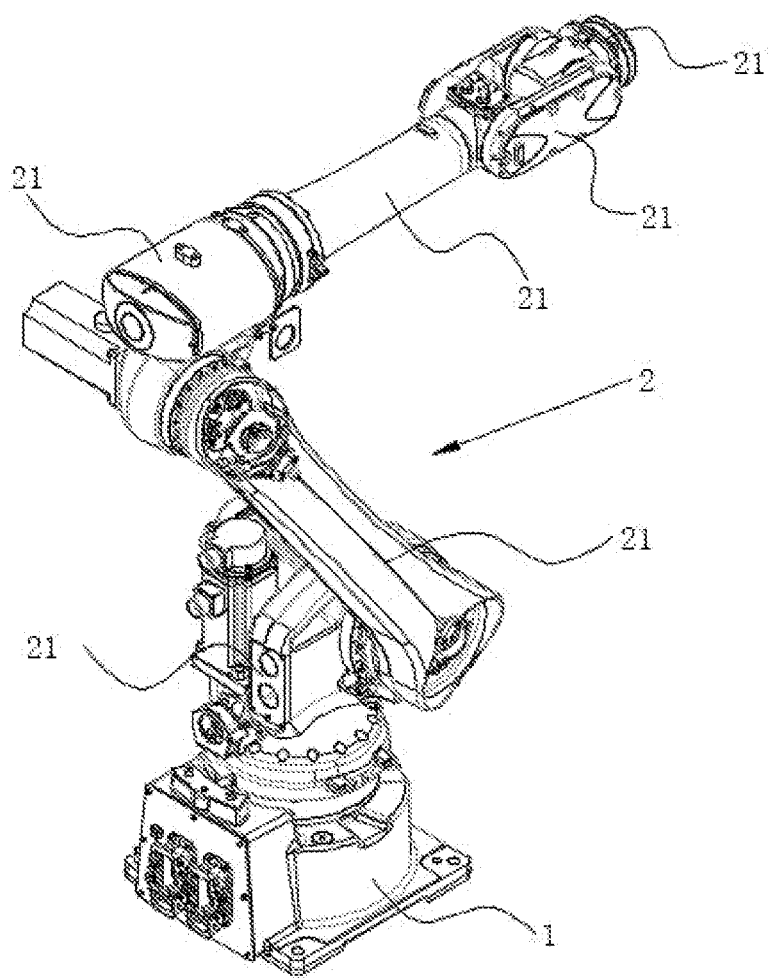
FIG. 9 is a third structural view of a robot according to an embodiment.

A robot is shown in FIGS. 9 and 2. The robot includes the base 1, the mechanical arm 2, and the driver controller integrated board 3. The mechanical arm 2 is movably mounted on the base 1. The driver controller integrated board 3 is disposed on the base 1, is configured to control the mechanical arm 2 to move, and includes the control module 31, the drive module 32, and the substrate 33, where the control module 31 and the drive module 32 are disposed on the substrate 33, and the control module 31 is electrically connected to the drive module 32. The control module 31 and the drive module 32 are disposed on the same substrate 33 so that the overall structure of the control module 31 and the drive module 32 is more compact, less installation space is required, and the overall structure of the robot is more compact.

Optionally, at least two driver controller integrated boards 3 are provided, all the driver controller integrated boards 3 are spaced apart, stacked, and connected in cascade in sequence, and each driver controller integrated board 3 controls at least one arm body 21 of the mechanical arm 2. One driver controller integrated board 3 controls one arm body 21 of the mechanical arm 2. The number of the driver controller integrated boards 3 is equal to the number of arm bodies 21 of the mechanical arm 2.

Optionally, any driver controller integrated board 3 can act as the master control board, and any driver controller integrated board 3 is configured to control the signals from all the driver controller integrated boards 3 and is connected to the external device signal. Through the preceding design, a control system of the robot can be more flexible and the whole robot unable to work due to the damage of a main control board can be avoided. When one driver controller integrated board 3 is damaged, another driver controller integrated board 3 can be used as the main control board to achieve the overall control of the robot.

Optionally, as shown in FIG. 3, the robot further includes the connecting seat 4, where the connecting seat 4 includes more than two first cascade sockets 41 for more than two driver controller integrated boards 3 to be plugged in, and all the first cascade sockets 41 are spaced apart and connected in cascade in sequence. The connecting seat 4 with the first cascade sockets 41 is provided. Therefore, on the one hand, the installation reliability of the driver controller integrated board 3 can be improved; on the other hand, the quick assembly and disassembly of the driver controller integrated board and the connecting seat 4 can be facilitated, thereby improving the convenience and flexibility of using different driver controller integrated boards 3 in combination.

Optionally, the robot further includes a heat dissipation structure, where the heat dissipation structure is disposed on the base 1.

Optionally, the heat dissipation structure uses air cooling heat dissipation.

The heat dissipation structure includes a first cooling fan, where the first cooling fan is opposite to the driver controller integrated plate 3, and the first cooling fan is configured to accelerate the diffusion of heat from the driver controller integrated plate 3 to all regions within the base 1 and dissipate the heat to the outer side through the wall body of the base 1. Optionally, the base 1 is provided with an accommodation cavity, and the driver controller integrated board 3 and the heat dissipation structure are both disposed in the accommodation cavity.

The heat dissipation structure includes a second cooling fan, the base 1 is provided with a heat dissipation hole, the second cooling fan is aligned with the heat dissipation hole, and the second fan is configured to discharge the heat from the inner side of the base 1 to the outer side of the base 1.

The first cooling fan and the second cooling fan are not necessarily provided at the same time, and in some cases, only one of the first cooling fan and the second cooling fan may be provided separately. Optionally, the base 1 is provided with an accommodation cavity, and the driver controller integrated board 3 and the heat dissipation structure are both disposed in the accommodation cavity.

Optionally, the heat dissipation structure includes a heat sink, where the heat sink is disposed on the wall body of the base 1. The heat sink is disposed on the outer side and/or inner side of the wall body 21 of the base 1, and the driver controller integrated board 3 is disposed near the wall body on which the heat sink is disposed. This design can improve the heat dissipation effect of the driver controller integrated board 3.

Optionally, as shown in FIG. 5, the driver controller integrated board 3 further includes the first communication module 34 disposed on the substrate 33, where the first communication module 34 is electrically connected to the control module 31. The first communication module 34 is configured to be connected to the network. The first communication module 34 is connected to the network in a wired or wireless manner. When more than two driver controller integrated boards 3 are provided, different driver controller integrated boards 3 are connected to each other by the signals from first communication modules 34 of the different driver controller integrated boards 3.

Optionally, the control module 31 includes the first control part 311 and the second control part 312, where the first control part 311 and the first communication module 34 are disposed on the first side of the substrate 33, and the second control part 312 and the drive module 32 are disposed on the second side of the substrate 33.

Optionally, the first control part 311 is electrically connected to the second control part 312, and the first control part 311 and/or the second control part 312 are electrically connected to the drive module 32.

Optionally, the base 1 is provided with an accommodation cavity, and the driver controller integrated board 3 is disposed in the accommodation cavity.

Optionally, the robot further includes a control function board or a drive function board, where the control function board or the drive function board is disposed on the mechanical arm 2. In the preceding manner, the separate control function board or drive function board may be disposed on the mechanical arm 2 so that the driver controller integrated board 3 and the control function board or the drive function board control the mechanical arm 2 to move. For example, the drive function board is disposed on one arm body 21 of the mechanical arm 2, the drive function board is connected to the control module 31 of the driver controller integrated board 3, the drive function board and the control module 31 control at least one arm body 21 to move, and the control module 31 and the drive module 32 control other arm bodies 21 to move.

Alternatively, the control function board is disposed on one arm body 21 of the mechanical arm 2, the control function board is electrically connected to the drive module 32 of the driver controller integrated board 3, the control function board and the drive module 32 control all the arm bodies 21 to move, and the control module 31 and the drive module 32 may also control all the arm bodies 21 to move. Alternatively, the control function board and the drive function board are disposed on one arm body 21 of the mechanical arm 2, or the control function board is disposed on one arm body 21 of the mechanical arm 2 and the drive function board is disposed on another arm body 21, the control function board and the drive function board are electrically connected, the control function board and the drive function board control at least one arm body 21 to move, and the control module 31 and the drive module 32 may control other arm bodies 21 to move.

Embodiment Sixteen

Figure 10:
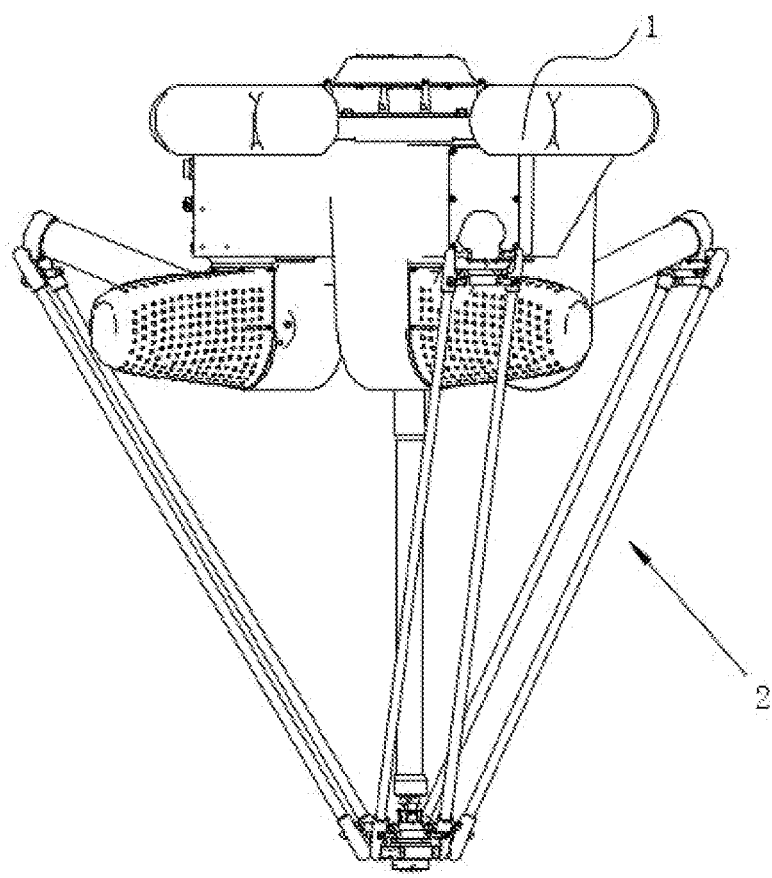
FIG. 10 is a fourth structural view of a robot according to an embodiment.

A robot is shown in FIGS. 10 and 2. The robot includes the base 1, the mechanical arm 2, and the driver controller integrated board 3. The mechanical arm 2 is movably mounted on the base 1. The driver controller integrated board 3 is disposed on the base 1, is configured to control the mechanical arm 2 to move, and includes the control module 31, the drive module 32, and the substrate 33, where the control module 31 and the drive module 32 are disposed on the substrate 33, and the control module 31 is electrically connected to the drive module 32. The control module 31 and the drive module 32 are disposed on the same substrate 33 so that the overall structure of the control module 31 and the drive module 32 is more compact, less installation space is required, and the overall structure of the robot is more compact.

Optionally, at least two driver controller integrated boards 3 are provided, all the driver controller integrated boards 3 are spaced apart, stacked, and connected in cascade in sequence, and each driver controller integrated board 3 controls at least one arm body 21 of the mechanical arm 2. Further, one driver controller integrated board 3 controls one arm body 21 of the mechanical arm 2. The number of the driver controller integrated boards 3 is equal to the number of arm bodies 21 of the mechanical arm 2.

Optionally, any driver controller integrated board 3 can act as the master control board, and any driver controller integrated board 3 is configured to control the signals from all the driver controller integrated boards 3 and is connected to the external device signal. Through the preceding design, a control system of the robot can be more flexible and the whole robot unable to work due to the damage of a main control board can be avoided. When one driver controller integrated board 3 is damaged, another driver controller integrated board 3 can be used as the main control board to achieve the overall control of the robot.

Optionally, as shown in FIG. 3, the robot further includes the connecting seat 4, where the connecting seat 4 includes more than two first cascade sockets 41 for at least two driver controller integrated boards 3 to be plugged in, and all the first cascade sockets 41 are spaced apart and connected in cascade in sequence. The connecting seat 4 with the first cascade sockets 41 is provided. Therefore, on the one hand, the installation reliability of the driver controller integrated board 3 can be improved; on the other hand, the quick assembly and disassembly of the driver controller integrated board and the connecting seat 4 can be facilitated, thereby improving the convenience and flexibility of using different driver controller integrated boards 3 in combination.

Optionally, the robot further includes a heat dissipation structure, where the heat dissipation structure is disposed on the base 1.

Optionally, the heat dissipation structure uses air cooling heat dissipation.

The heat dissipation structure includes a first cooling fan, where the first cooling fan is opposite to the driver controller integrated plate 3, and the first cooling fan is configured to accelerate the diffusion of heat from the driver controller integrated plate 3 to all regions within the base 1 and dissipate the heat to the outer side through the wall body of the base 1. Optionally, the base 1 is provided with an accommodation cavity, and the driver controller integrated board 3 and the heat dissipation structure are both disposed in the accommodation cavity.

The heat dissipation structure includes a second cooling fan, the base 1 is provided with a heat dissipation hole, the second cooling fan is aligned with the heat dissipation hole, and the second fan is configured to discharge the heat from the inner side of the base 1 to the outer side of the base 1. Optionally, the base 1 is provided with an accommodation cavity, and the driver controller integrated board 3 and the heat dissipation structure are both disposed in the accommodation cavity.

The first cooling fan and the second cooling fan are not necessarily provided at the same time, and in some cases, only one of the first cooling fan and the second cooling fan may be provided separately.

Optionally, the heat dissipation structure includes a heat sink, where the heat sink is disposed on the wall body of the base 1. The heat sink is disposed on the outer side and/or inner side of the wall body 21 of the base 1, and the driver controller integrated board 3 is disposed near the wall body on which the heat sink is disposed. This design can improve the heat dissipation effect of the driver controller integrated board 3.

Optionally, as shown in FIG. 5, the driver controller integrated board 3 further includes the first communication module 34 disposed on the substrate 33, where the first communication module 34 is electrically connected to the control module 31. The first communication module 34 is configured to be connected to the network. The first communication module 34 is connected to the network in a wired or wireless manner. When more than two driver controller integrated boards 3 are provided, different driver controller integrated boards 3 are connected to each other by the signals from first communication modules 34 of the different driver controller integrated boards 3.

Optionally, the control module 31 includes the first control part 311 and the second control part 312, where the first control part 311 and the first communication module 34 are disposed on the first side of the substrate 33, and the second control part 312 and the drive module 32 are disposed on the second side of the substrate 33.

Optionally, the first control part 311 is electrically connected to the second control part 312, and the first control part 311 and/or the second control part 312 are electrically connected to the drive module 32.

Optionally, the base 1 is provided with an accommodation cavity, and the driver controller integrated board 3 is disposed in the accommodation cavity.

Optionally, the robot further includes a control function board or a drive function board, where the control function board or the drive function board is disposed on the mechanical arm 2. In the preceding manner, the separate control function board or drive function board may be disposed on the mechanical arm 2 so that the driver controller integrated board 3 and the control function board or the drive function board control the mechanical arm 2 to move. For example, the drive function board is disposed on one arm body 21 of the mechanical arm 2, the drive function board is connected to the control module 31 of the driver controller integrated board 3, the drive function board and the control module 31 control at least one arm body 21 to move, and the control module 31 and the drive module 32 control other arm bodies 21 to move.

Alternatively, the control function board is disposed on one arm body 21 of the mechanical arm 2, the control function board is electrically connected to the drive module 32 of the driver controller integrated board 3, the control function board and the drive module 32 control all the arm bodies 21 to move, and the control module 31 and the drive module 32 may also control all the arm bodies 21 to move. Alternatively, the control function board and the drive function board are disposed on one arm body 21 of the mechanical arm 2, or the control function board is disposed on one arm body 21 of the mechanical arm 2 and the drive function board is disposed on another arm body 21, the control function board and the drive function board are electrically connected, the control function board and the drive function board control at least one arm body 21 to move, and the control module 31 and the drive module 32 may control other arm bodies 21 to move.

In the description here, it is to be understood that orientations or position relations indicated by terms such as "upper", "lower", "left", and "right" are based on the drawings. These orientations or position relations are intended only to facilitate description and simplify operations and not to indicate or imply that a device or element referred to must have such particular orientations or must be configured or operated in such particular orientations. Thus, these orientations or position relations are not to be construed as limiting the present application. In addition, the terms "first" and "second" are used only to distinguish between descriptions and have no special meaning.

In the description of the specification, the description of reference terms "an embodiment" or "example" means that specific characteristics, structures, materials, or features described in connection with the embodiment or example are included in at least one embodiment or example of the present application. In the specification, the illustrative description of the preceding terms does not necessarily refer to the same embodiment or example.

What is claimed is:
1. A robot, comprising:
a base;
a mechanical arm movably mounted on the base; and
a driver controller integrated board disposed on the base, configured to control the mechanical arm to move, and comprising a control module, a drive module, and a substrate, wherein the control module and the drive module are disposed on the substrate, and the control module is electrically connected to the drive module;
wherein at least two driver controller integrated boards are provided, the robot further comprises a connecting seat, the connecting seat comprises at least two first cascade sockets for the at least two driver controller integrated boards to be plugged in, respectively, and all the at least two driver controller integrated boards are spaced apart and connected in cascade in sequence;

wherein any of the at least two driver controller integrated boards is capable of acting as a master control board, and the driver controller integrated board which acts as the master control board is configured to control signals from all the at least two driver controller integrated boards and is connected to an external device signal; and when the driver controller integrated board which acts as the master control board is damaged, another driver controller integrated board is capable of using as the master control board to achieve the overall control of the robot.

2. The robot of claim 1, wherein the mechanical arm comprises a plurality of arm bodies, and each of the at least two driver controller integrated boards controls at least one of the plurality of arm bodies of the mechanical arm.

3. The robot of claim 1, further comprising a drive mechanism, wherein the drive mechanism is mounted on the base or the mechanical arm, the drive mechanism is electrically connected to the driver controller integrated board, and the drive mechanism is configured to drive the mechanical arm to move according to a drive signal outputted by the driver controller integrated board; and,
wherein the base is provided with an accommodation cavity, and the drive mechanism is mounted in the accommodation cavity; or
wherein the drive mechanism comprises a drive motor and a deceleration assembly, wherein the drive motor is mounted on the base or the mechanical arm, the deceleration assembly is mounted on the drive motor, and an output end of the drive motor is transmissively connected to the deceleration assembly; or
wherein the drive mechanism is a drive device made of piezoelectric ceramic.

4. The robot of claim 3, wherein the drive mechanism further comprises a flange, wherein the flange is mounted on the base or the mechanical arm, and the drive motor and the deceleration assembly are mounted on the flange.

5. The robot of claim 1, further comprising a heat dissipation structure, wherein the heat dissipation structure is disposed on the base;
and, wherein the heat dissipation structure uses air cooling heat dissipation.

6. The robot of claim 5, wherein the heat dissipation structure comprises a first cooling fan, wherein the first cooling fan is opposite to the driver controller integrated plate, and the first cooling fan is configured to accelerate diffusion of heat from the driver controller integrated plate to all regions within the base and dissipate the heat to an outer side through a wall body of the base; or
wherein the heat dissipation structure comprises a second cooling fan, the base is provided with a heat dissipation hole, the second cooling fan is opposite to the heat dissipation hole, and the second cooling fan is configured to discharge heat from an inner side of the base to an outer side of the base; or
wherein the heat dissipation structure comprises a heat sink, wherein the heat sink is disposed on a wall body of the base, preferably, wherein the driver controller integrated board is disposed near the wall body on which the heat sink is disposed.

7. The robot of claim 1, wherein the driver controller integrated board further comprises a first communication module disposed on the substrate, wherein the first communication module is electrically connected to the control module;
and, wherein the first communication module is configured to be connected to a network;
and, wherein the first communication module is connected to the network in a wired or wireless manner.

8. The robot of claim 7, wherein the control module comprises a first control part and a second control part, wherein the first control part and the first communication module are disposed on a first side of the substrate, and the second control part and the drive module are disposed on a second side of the substrate.

9. The robot of claim 1, wherein each of the at least two driver controller integrated boards further comprises a first communication module disposed on the substrate, wherein the first communication module is electrically connected to the control module, and different ones of the at least two driver controller integrated boards are connected to each other by signals from first communication modules of the different ones of the at least two driver controller integrated boards.

10. The robot of claim 1, further comprising a connecting plate, wherein the connecting plate and the at least two driver control integrated boards are spaced apart and stacked, the connecting plate is configured to control signals from all the at least two driver controller integrated boards and is connected to an external device signal, the connecting plate comprises a third control part and a mounting plate, the third control part is disposed on the mounting plate, the at least two driver controller integrated boards are connected in cascade in sequence, and the third control part is electrically connected to at least one of the at least two driver controller integrated boards.

11. The robot of claim 10, wherein the connecting plate further comprises a second communication module, wherein the second communication module is disposed on the mounting plate, and the third control part is electrically connected to the second communication module and at least one of the at least two driver controller integrated boards; and,
wherein the second communication module is configured to be connected to a network in a wired or wireless manner.

12. The robot of claim 10, wherein the connecting seat further comprises one second cascade socket for the connecting plate to be plugged in, and the second cascade socket is electrically connected to at least one of the at least two first cascade sockets.

13. The robot of claim 1, wherein the base is provided with an accommodation cavity, and the driver controller integrated board is disposed in the accommodation cavity; or
wherein the robot further comprises a control function board or a drive function board, wherein the control function board or the drive function board is disposed on the mechanical arm.

14. A robot, comprising:
a base;
a mechanical arm movably mounted on the base;
a control box spaced apart from the base; and
a driver controller integrated board disposed in the control box, configured to control the mechanical arm to move, and comprising a control module, a drive module, and a substrate, wherein the control module and the drive module are disposed on the substrate, and the control module is electrically connected to the drive module;
wherein at least two driver controller integrated boards are provided, the robot further comprises a connecting seat, the connecting seat comprises at least two first cascade sockets for the at least two driver controller integrated boards to be plugged in, respectively, and all the at least two driver controller integrated boards are spaced apart and connected in cascade in sequence;

wherein any of the at least two driver controller integrated boards is capable of acting as a master control board, and the driver controller integrated board which acts as the master control board is configured to control signals from all the at least two driver controller integrated boards and is connected to an external device signal; and when the driver controller integrated board which acts as the master control board is damaged, another driver controller integrated board is capable of using as the master control board to achieve the overall control of the robot.

15. The robot of claim 14, wherein the mechanical arm comprises a plurality of arm bodies, and each of the at least two driver controller integrated boards controls at least one of the plurality of arm bodies of the mechanical arm.

16. The robot of claim 15, wherein each of the at least two driver controller integrated boards further comprises a first communication module disposed on the substrate, wherein the first communication module is electrically connected to the control module, and different ones of the at least two driver controller integrated boards are connected to each other by signals from first communication modules of the different ones of the at least two driver controller integrated boards.

17. The robot of claim 14, further comprising one of the following:
   a heat dissipation structure, wherein the heat dissipation structure is disposed in a control box; or
   a control function board or a drive function board, wherein the control function board or the drive function board is disposed on the mechanical arm.

18. The robot of claim 14, wherein the driver controller integrated board further comprises a first communication module disposed on the substrate, wherein the first communication module is electrically connected to the control module; and
   wherein the first communication module is configured to be connected to a network in a wired or wireless manner.

19. A robot, comprising:
   a base;
   a mechanical arm movably mounted on the base; and
   a driver controller integrated board comprising a drive board and a control board, wherein the drive board and the control board are connected to each other in a daisy chain and are disposed on the base, the drive board is electrically connected to the control board, and the driver controller integrated board is configured to control the mechanical arm to move;
   wherein at least two driver controller integrated boards are provided, all the at least two driver controller integrated boards are stacked and connected in cascade in sequence;
   any of the at least two driver controller integrated boards is capable of acting as a master control board, and the driver controller integrated board which acts as the master control board is configured to control signals from all the at least two driver controller integrated boards and is connected to an external device signal; and when the driver controller integrated board which acts as the master control board is damaged, another driver controller integrated board is capable of using as the master control board to achieve the overall control of the robot.

20. The robot of claim 19, wherein the mechanical arm comprises a plurality of arm bodies, and each of the at least two driver controller integrated boards controls at least one of the plurality of arm bodies of the mechanical arm.

21. The robot of claim 20, wherein each of the at least two driver controller integrated boards further comprises a communication board, wherein the communication board is electrically connected to at least one of the control board and the drive board, and different ones of the at least two driver controller integrated boards are connected to each other by signals from communication boards of the different ones of the at least two driver controller integrated boards.

22. The robot of claim 19,
   wherein the base is provided with an accommodation cavity, and the driver controller integrated board is disposed in the accommodation cavity.

23. The robot of claim 19, further comprising one of the following:
   a heat dissipation structure, wherein the heat dissipation structure is disposed on the base; or
   a control function board or a drive function board, wherein the control function board or the drive function board is disposed on the mechanical arm.

24. The robot of claim 19, wherein the driver controller integrated board further comprises a communication board, wherein the communication board is electrically connected to the control board;
   wherein the communication board is configured to be connected to the network in a wired or wireless manner.

* * * * *